(12) United States Patent
Wang et al.

(10) Patent No.: US 9,125,173 B2
(45) Date of Patent: Sep. 1, 2015

(54) DEVICE AND METHOD FOR ACCESS PROBE ENHANCEMENTS

(71) Applicant: VIA Telecom, Inc., San Diego, CA (US)

(72) Inventors: Shu Wang, San Diego, CA (US); Hong-Kui Yang, San Diego, CA (US)

(73) Assignee: VIA Telecom Co., Ltd., Grand Cayman (KY)

( * ) Notice: Subject to any disclaimer, the term of this patent is extended or adjusted under 35 U.S.C. 154(b) by 109 days.

(21) Appl. No.: 13/778,158

(22) Filed: Feb. 27, 2013

(65) Prior Publication Data

US 2013/0223367 A1 Aug. 29, 2013

Related U.S. Application Data

(60) Provisional application No. 61/604,718, filed on Feb. 29, 2012.

(51) Int. Cl.
*H04W 74/00* (2009.01)
*H04B 7/216* (2006.01)

(52) U.S. Cl.
CPC ............. *H04W 74/00* (2013.01); *H04B 7/216* (2013.01)

(58) Field of Classification Search
CPC .............................. H04W 74/00; H04B 7/216
USPC .................... 370/329, 335, 336, 338, 342
See application file for complete search history.

(56) References Cited

U.S. PATENT DOCUMENTS

| | | | |
|---|---|---|---|
| 6,018,667 A * | 1/2000 | Ghosh et al. .................. 455/502 |
| 6,167,056 A * | 12/2000 | Miller et al. ................... 370/441 |
| 6,424,831 B1 * | 7/2002 | Schiff ............................ 455/429 |
| 7,457,624 B2 * | 11/2008 | Shinoda ........................ 455/440 |
| 8,180,378 B2 | 5/2012 | Wang et al. |
| 8,331,327 B1 * | 12/2012 | Vargantwar et al. .......... 370/332 |
| 2007/0099645 A1 * | 5/2007 | Kim ............................... 455/522 |
| 2007/0270108 A1 * | 11/2007 | Kim et al. ....................... 455/91 |
| 2010/0113063 A1 * | 5/2010 | Han et al. .................... 455/456.1 |
| 2011/0051697 A1 | 3/2011 | Wang et al. |
| 2011/0085497 A1 * | 4/2011 | Fang et al. .................... 370/328 |
| 2012/0076157 A1 * | 3/2012 | Roh et al. ...................... 370/474 |

OTHER PUBLICATIONS

McGrath, Eileen, and Clifton Barber, "Study for Machine-to-machine (M2M) communication for cdma2000 networks", 3GPP2, S.R0141-0. Version 1.0, Dec. 9, 2010.*

* cited by examiner

*Primary Examiner* — Chi H Pham
*Assistant Examiner* — Shailendra Kumar
(74) *Attorney, Agent, or Firm* — Jianq Chyun IP Office

(57) ABSTRACT

Methods and wireless communication devices for access procedure enhancement are provided. The wireless communication device for access procedure enhancement includes a transceiver module and a communication protocol module. The transceiver module performs wireless transmissions and receptions to and from a network. The communication protocol module divides an access channel into a plurality of narrow band frequency division multiplexing (FDM) channels, groups a plurality of reverse link FDM access channels (R-FACH) into a plurality of R-FACH groups, determines whether a base station in a network supports an access probe. If yes, the base station joins at least one R-FACH group. The wireless communication device sends the access probe in a chosen R-FACH during each access procedure.

10 Claims, 6 Drawing Sheets

DEVICE AND METHOD FOR ACCESS PROBE ENHANCEMENTS

CROSS-REFERENCE TO RELATED APPLICATION

This application claims the priority benefits of U.S. provisional application Ser. No. 61/604,718, filed on Feb. 29, 2012. The entirety of the above-mentioned patent applications is hereby incorporated by reference herein and made a part of this specification.

BACKGROUND

1. Technical Field

The invention relates generally to devices and methods for Machine to Machine communication, and more particularly, to devices and methods for access procedure enhancements.

2. Related Art

Machine to Machine (M2M) communication is defined as the information exchange between a subscriber station (or a wireless communication device) and a server in the core network, or just between subscriber stations, which may be carried out without any human interactions. Due to the potential of M2M communication technologies, enhancements for enabling M2M communications are being developed for wireless access networks, such as Global System for Mobile Communication/General Packet Radio Service (GSM/GPRS), Universal Mobile Telecommunication System (UMTS), 1x Code Division Multiple Access 2000 (1x CDMA 2000) system, 1x High Rate Packet Data (1xHRPD) system, and Long Term Evolution (LTE) system, etc.

However, an access channel used by most M2M terminals to transmit the data traffic is a shared common channel for all M2M terminals in the same service area. Moreover, since most M2M communication is module driven, access collisions can be caused by the access dimension limit as module penetration is increased. Due to access collisions, the reverse link (RL) rise over thermal (RoT) as well as report/control delay are increased, while RL capacity and module battery life are decreased. Therefore, it is desirable to have access probes which minimize the impact on the existing services when M2M terminals increase, and improve the access success rate of the M2M terminals. The challenges, on the other hand, include the RoT contribution from the M2M terminals, the potential dimension limit of the current RL channels, as well as other related problems such as macro-diversity and the detection complexity dilemma, network imbalance, and the load and throughput dilemma. Additional considerations may also include implementation, network positioning, and terminal battery life improvement.

SUMMARY

Several exemplary embodiments accompanied with figures are described in detail below to further describe the invention in details.

The invention provides a method for access procedure enhancement by a wireless communication device including a transceiver module for wireless transmissions and receptions. The method for access procedure enhancement includes the following steps. A page message is received from a base station through a network. At least one access probe is transmitted to the network via the transceiver module. Moreover, the transmission of the rest of an access probe payload of the at least one access probe is terminated according to a termination criterion, in which the access probe is transmitted using a transmission power which is lower than a first threshold, and the access probe is transmitted at a data rate lower than a second threshold.

The invention also provides a wireless communication device for access procedure enhancement, including a transceiver module and a communication protocol module. The transceiver module performs wireless transmissions and receptions to and from a network. The communication protocol module receives a page message from a base station through the network via the transceiver module, transmits at least one access probe to the network via the transceiver module, and terminates the transmission of the rest of an access probe payload of the at least one access probe according to a termination criterion. Moreover, the access probe is transmitted using a transmission power which is lower than a first threshold, and the access probe is transmitted at a data rate lower than a second threshold.

The invention further provides a method for access procedure enhancement by a wireless communication device including a transceiver module for wireless transmissions and receptions. The method for access procedure enhancement includes the following steps. An access channel is divided into a plurality of narrow band frequency division multiplexing (FDM) channels. A plurality of reverse link FDM access channels (R-FACHs) are grouped into a plurality of R-FACH groups. Whether a base station in a network supports an access probe is determined, and if yes, the base station joins at least one R-FACH group. The access probes are sent in a chosen R-FACH during each access procedure.

The invention further provides a wireless communication device for access procedure enhancement, including a transceiver module and a communication protocol module. The transceiver module performs wireless transmissions and receptions to and from a network. The communication protocol module divides an access channel into a plurality of narrow band frequency division multiplexing (FDM) channels, groups a plurality of reverse link FDM access channels (R-FACH) into a plurality of R-FACH groups, determines whether a base station in a network supports an access probe. If yes, the base station joins at least one R-FACH group. The wireless communication device sends the access probe in a chosen R-FACH during each access procedure.

In summary, embodiments of the invention have discussed wireless communication devices and methods for access procedure enhancement which enable access probes that minimize the impact on the existing services when M2M terminals increase, and improve the access success rate of the M2M terminals. By adopting the devices and methods set forth in the disclosure, issues such as the RoT contribution from the M2M terminals, the potential dimension limit of the current RL channels, as well as other related problems such as macro-diversity and the detection complexity dilemma, network imbalance, and the load and throughput dilemma can be alleviated. The devices and methods set forth in the disclosure can also provide enhancements to network positioning and terminal battery life.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DETAILED DESCRIPTION OF DISCLOSED EMBODIMENTS

Figure 1:
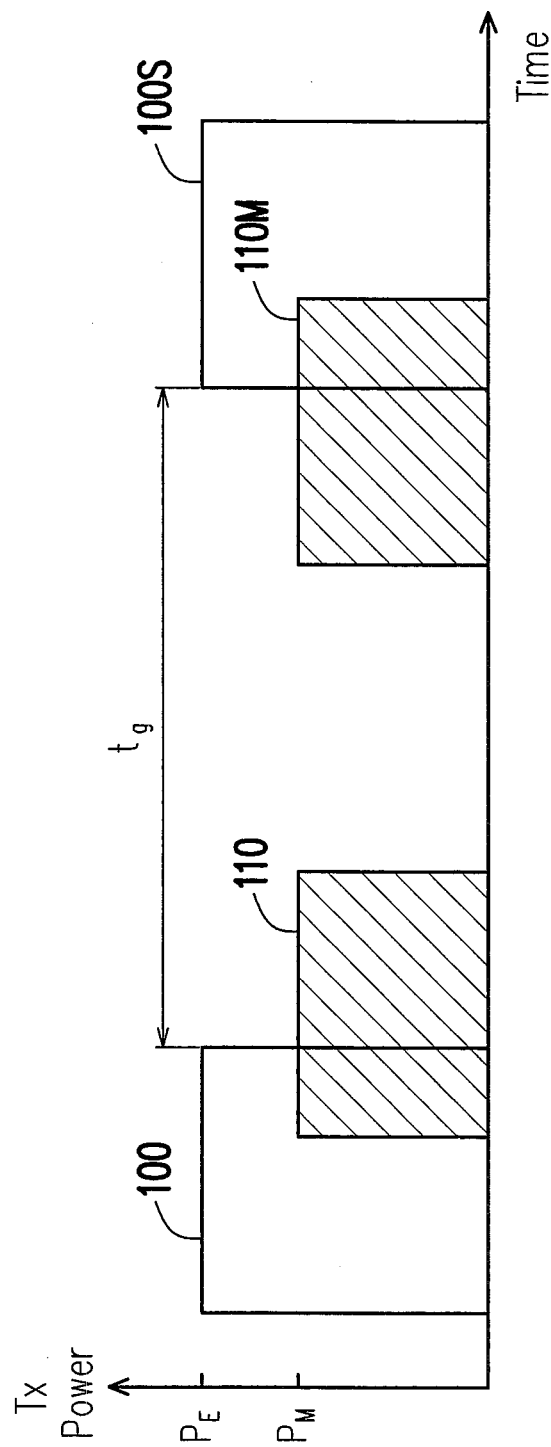
FIG. 1 is a schematic view illustrating a conventional access procedure of wireless communication devices.

Some embodiments of the present application will now be described more fully hereinafter with reference to the accompanying drawings, in which some, but not all embodiments of the application are shown. Indeed, various embodiments of the application may be embodied in many different forms and should not be construed as limited to the embodiments set forth herein; rather, these embodiments are provided so that this disclosure will satisfy applicable legal requirements. Like reference numerals refer to like elements throughout.

In the present disclosure, there are proposed access procedure enhancement methods and wireless communication devices utilizing access probes which minimize the impact on the existing services, enable early termination and macro-diversity, and alleviate the dimension limit problem.

Throughout the disclosure, the wireless communication device could refer to an user equipment (UE), a mobile station, an advanced mobile station, a wireless terminal communication device, a M2M device, and so forth. The wireless communication device can be, for example, a digital television, a digital set-top box, a personal computer, a notebook PC, a tablet PC, a netbook PC, a mobile phone, a smart phone, a water meter, a gas meter, an electricity meter, an emergency alarm device, a sensor device, a video camera, and so forth. Also, the base station (BS) could refer to an advanced base station (ABS), a node B, an enhanced node B (eNB), and so forth.

FIG. 1 is a schematic view illustrating a conventional access procedure of wireless communication devices. With reference to FIG. 1, two access probes 100 and 100S of existing services are transmitted by two separate wireless communication devices, e.g. mobile devices, using an initial transmission power $P_E$, and a time period $t_g$ denotes an access gap between the two access probes 100 and 100S of existing services of a 1x network, for example. Typically speaking, M2M access probes 110 and 110M are transmitted by the wireless communication devices with relatively strong transmission power $P_M$ in order to avoid access collisions. The M2M access probes 110 and 110M are transmitted with the relatively strong transmission power $P_M$ in the hope that the access probes 110 and 110M would be short enough to arrive at a base station inside the access gap $t_g$. However, due to the access probe overlaps with each other resulting from the dimension limit of the access channels, and interference from the lack of access timing information between the M2M devices (e.g., when using the pure ALOHA protocol), or the difficulty of implementing very short access probes arriving inside the access gap $t_g$, collisions may occur between the access probes 100 and 110 and the access probes 100S and 110M, as shown in FIG. 1. Although the overlapping of the access probes of the existing services and the future M2M probes do not always result in collision, collision is more likely to occur when the transmission power $P_M$ of the overlapped M2M access probes 110 and 110M to the base station is relatively strong. Since the time is relatively shorter, the collision is more likely to happen even if there is a small overlap.

Accordingly, embodiments of the disclosure propose a two dimension (2D) mechanism of code division multiplexing (CDM) and frequency division multiplexing (FDM) for M2M communication to enhance the access channels, so as to overcome the dimension limit problem in the art and alleviate access collisions and to achieve other benefits. In the CDM approach, the spreading gain of each access probe preamble can be increased, and the data rate of each access probe payload can be decreased by reducing the transmission power of the access probes. On the other hand, in the FDM approach, FDM or Orthogonal Frequency Division Multiple Access (OFDMA) sub-channels can be used and the processing gain can be increased.

Figure 2:
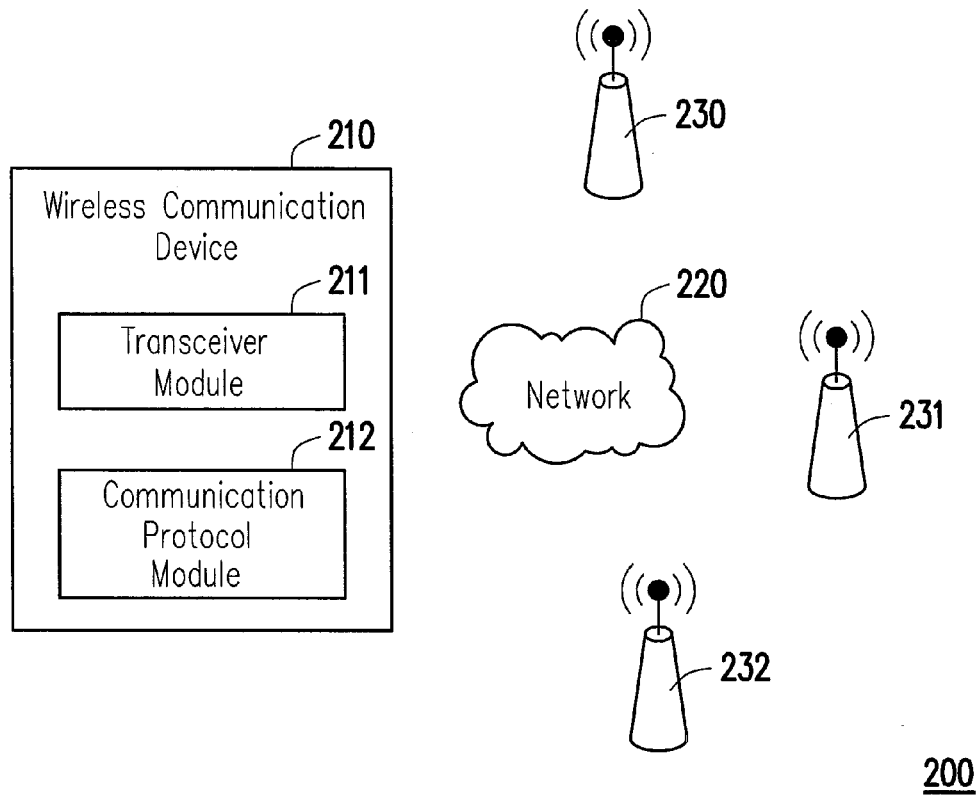
FIG. 2 is a schematic view illustrating a wireless communication system according to an embodiment of the invention.

FIG. 2 is a schematic view illustrating a wireless communication system according to an embodiment of the invention. With reference to FIG. 2, a wireless communication system 200 may include a wireless communication device 210, a network 220, and the base stations 230-232. The wireless communication device 210 includes a transceiver module 211 and a communication protocol module 212. The transceiver module 212 is capable of performing wireless transmissions and receptions to and from the network 220 in order to communicate with the base stations 230-232, for example. The base stations 230-232 may belong to different sectors of the network 220, or the base stations 230-232 may belong to a same sector.

In specifics, the transceiver module 211 may include a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may include a mixer to multiply the baseband signals with a carrier oscillated in the radio frequency of the wireless communication system 200, wherein the radio frequency may be 900 MHz, 1800 MHz or 1900 MHz utilized in GSM systems, or may be 900 MHz, 1900 MHz or 2100 MHz utilized in WCDMA systems, or others depending on the radio access technology (RAT) in use. Also, the communication protocol module may include other functional components for controlling the transceiver module 211, such as a display unit and/or keypad serving as a MMI (man-machine interface), a storage unit storing the program codes of applications or communication protocols, or others.

To be more specific, the communication protocol module 212 may control the transceiver module 211 to perform an access procedure with the network 220 and the base stations 230-232. The communication protocol module 212 receives a page message from one of the base stations 230-232 through the network 220 via the transceiver module 211, and then transmits at least one access probe to the network 220 via the transceiver module 211.

Figure 3:
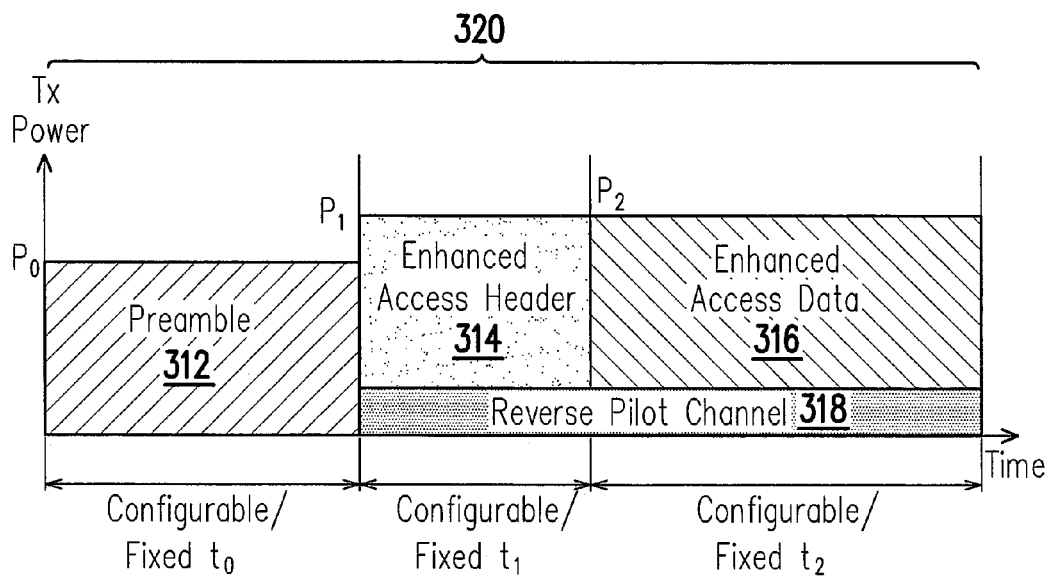
FIG. 3 is a schematic view of a access probe structure transmitted by the wireless communication device depicted in FIG. 2 according to an embodiment of the invention.

FIG. 3 is a schematic view of a access probe structure transmitted by the wireless communication device depicted in FIG. 2 according to an embodiment of the invention. For illustrative purposes, in this example the communication protocol module 212 receives the page message from the base station 230. In FIG. 3, an access probe 320 comprise a preamble 312, a enhanced access header 314 and an enhanced access data 316, wherein, the transmitting time of 312, 314 and 316 are configurable or fixed time $t_0$, $t_1$ and $t_2$ respectively, and the transmitting powers are $P_0$, $P_1$ and $P_2$ respectively. The enhanced access header 314 and the enhanced access data 316 are transmitting on the reverse pilot channel. With reference to FIGS. 2 and 3, the access probe 320 can be very long in time, and the communication protocol module 212 terminates the transmission of the rest of an access probe payload, that is enhanced access data 316 of the at least one access probe 320 according to a termination criterion. The access probe 320 is transmitted using a transmission power (e.g. $P_0$, $P_1$, and $P_2$) which is lower than a first threshold, and the access probe 320 is transmitted at a data rate lower than a second threshold. According to an embodiment of the invention, the termination criterion is determined according to whether the base station 230 has successfully decoded the access probe 320, and whether the wireless communication device 210 has received an acknowledgement from the base station 230. The wireless communication device 210 continues to transmit the access probe 320 when the base station 230 has not successfully decoded the access probe 320, or the wireless communication device 210 has not received an acknowledgement from the base station 230. Accordingly, due to imperfect open-loop power control of the transmission powers $P_0$, $P_1$, and $P_2$, as well as interference fluctuation and channel time diversity, it may be possible for the base station 230 to detect and decode the access probe 320 before the wireless communication device 210 finishes the transmission, and thereby achieve early termination on the access probe 320. Furthermore, early termination can be possible for the access probe 320 because its duration can be made a multiple of a paging cycle.

With reference to FIGS. 2 and 3, according to another embodiment of the invention, in order to achieve macro-diversity or soft handoff on RL access probe detection, more than one sectors of the network 220 simultaneously monitor each probe 320. The termination criterion is determined according to whether at least one sector of the network 220 has successfully detected the access probe 320 for reporting an access header 314 and a payload data 316 of the access probe 320 to the serving base station 230 and sending an acknowledgement through a page channel of the sector, and whether the wireless communication device 210 has received the acknowledgement from a monitored forward link paging channel (not shown). The wireless communication device 210 continues to transmit the access probe 320 when no sector has successfully detected the access probe 320, or the wireless communication device 210 has not received the acknowledgement from the monitored forward link paging channel.

According to an embodiment of the invention, the first threshold and the second threshold are determined according to at least one other access probe of an existing service in the network 220. For example, with reference to FIG. 1, the transmission power and the data rate of the access probe 320 may be determined in accordance to properties of the access probes 100 and/or 100S shown in FIG. 1, such that the access probe 320 can fill the access gap $t_g$ without impacting the access probes 100 and 100S of the existing services in the network 220. According to one example of the first and second thresholds, the data rate of the access probe 320 of FIG. 3 is less than 9.6 kbps, such as 2.4 kbps, for example. The access probe 320 may have a high processing gain, meaning a preamble length $t_0$ may be a multiple of the length of a standardized access probe preamble. The transmission powers $P_0$-$P_2$ can be determined according to the first threshold. The access probe 320 may have error detection and forward error correction (FEC) mechanisms with a low rate code of R=¼, for example, as well as a cyclic redundancy check (CRC) mechanism. Furthermore, a payload duration $t_2$ of the access probe 320 may be a multiple of 1.25 ms, such as 80 ms. The modulation scheme of the assess probe 320 can be quadrature phase-shift keying (QPSK), for example. Table 1 lists the properties of an exemplary access probe 320.

TABLE 1

| Type | Data Rate | Tail | Code | Code Rate | Payload | CRC | Frame Duration | Modulation |
|---|---|---|---|---|---|---|---|---|
| Header | 2400 | 0 | Tailbiting Conv. | 1/4 | 32 | 8 | 20 | QPSK |
| Data | 2400 | 0 | Tailbitin Conv. | 1/4 | 744/360/172 | 16/16/12 | 80xN | QPSK |

Figure 4:
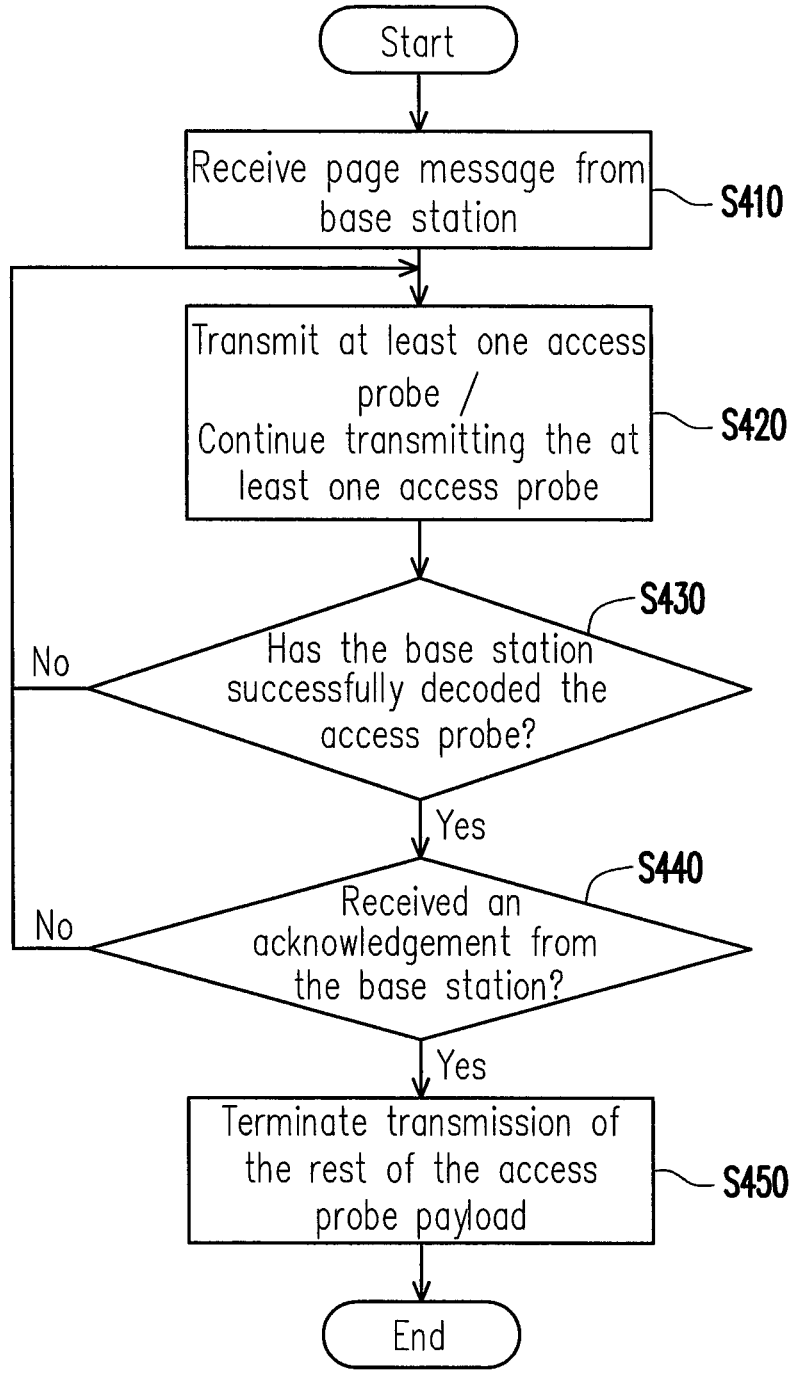
FIG. 4 is a flow diagram of a method for access procedure enhancement according to an embodiment of the invention.
Figure 5:
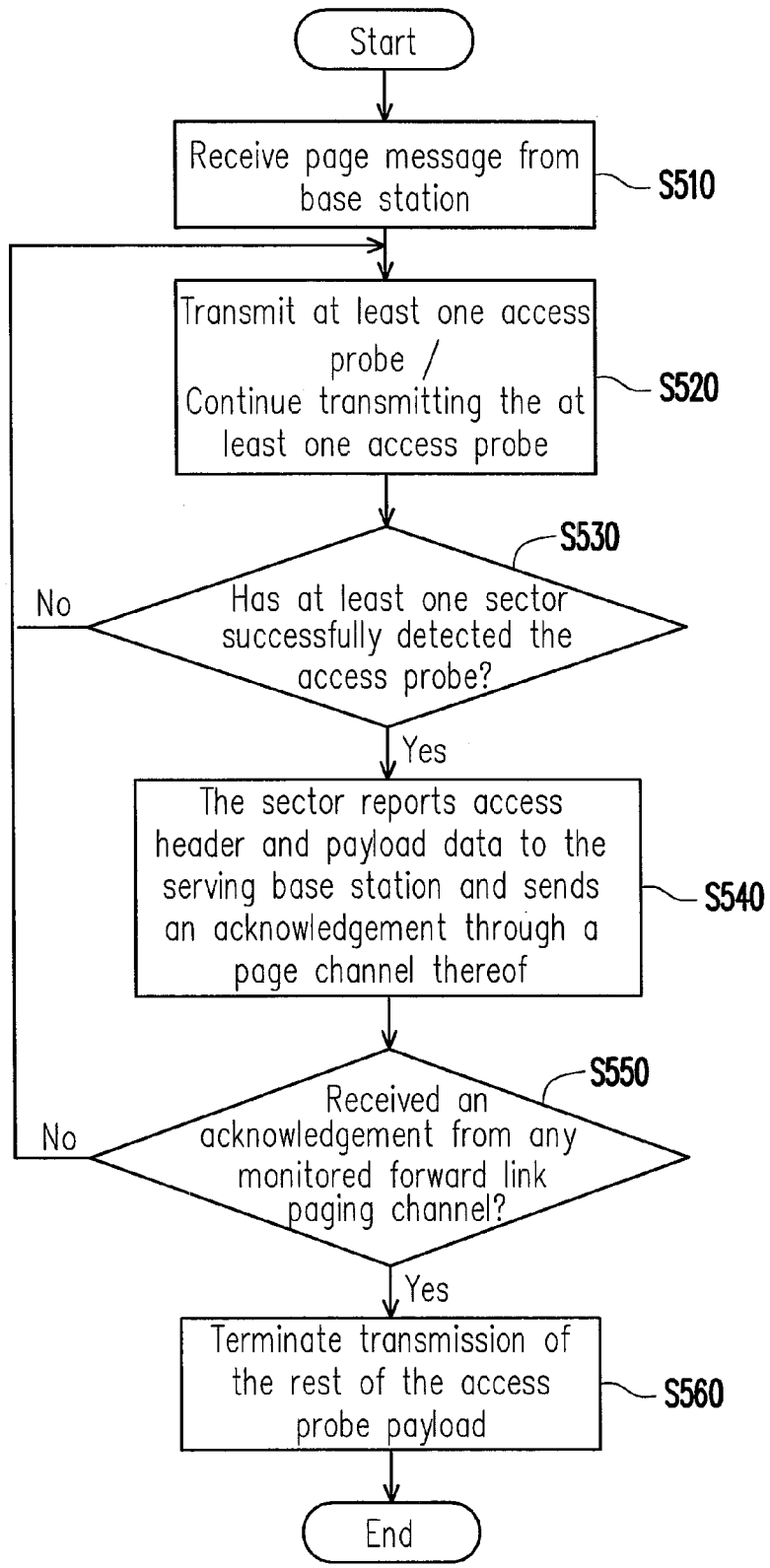
FIG. 5 is a flow diagram of a method for access procedure enhancement according to another embodiment of the invention.

In light of the foregoing description depicting reverse link enhanced access channels (R-EACHs) suitable for low power access probes having minimal impact to existing services, methods for access procedure enhancement by a wireless communication device including a transceiver module for wireless transmissions and receptions can be obtained. FIGS. 4 and 5 are flow diagrams of methods for access procedure enhancements according to embodiments of the invention. With reference to FIG. 4, in M2M communication, according to Step S410, a page message from a base station is received through a network via the transceiver module. In Step S420, at least one access probe is transmitted to the network via the transceiver module. In Step S450, the transmission of the rest of an access probe payload of the at least one access probe is terminated according to a termination criterion. Moreover, the access probe is transmitted using a transmission power which is lower than a first threshold, and the access probe is transmitted at a data rate lower than a second threshold. In one embodiment, the termination criterion is determined according to whether the base station has successfully decoded the access probe (Step S430), and whether the wireless communication device has received an acknowledgement from the base station (Step S440). When the base station has not successfully decoded the access probe, or the wireless communication device has not received an acknowledgement from the base, the process returns to Step S420, and the wireless communication device continues to transmit the access probe.

With reference to FIG. 5, in Step S510, a page message from a base station is received through a network via the transceiver module. In Step S520, at least one access probe is transmitted to the network via the transceiver module. In Step S560, the transmission of the rest of an access probe payload of the at least one access probe is terminated according to a termination criterion. In one embodiment, the termination criterion is determined according to whether at least one sector of the network has successfully detected the access probe (Step S530) for reporting an access header and a payload data of the access probe to the serving base station and sending an acknowledgement through a page channel of the sector (S540), and whether the wireless communication device has received the acknowledgement from a monitored forward link paging channel (Step S550). When no sector has successfully detected the access probe, or the wireless communication device has not received the acknowledgement from the monitored forward link paging channel, the process returns to Step S520, and the wireless communication device continues to transmit the access probe.

Figure 6:
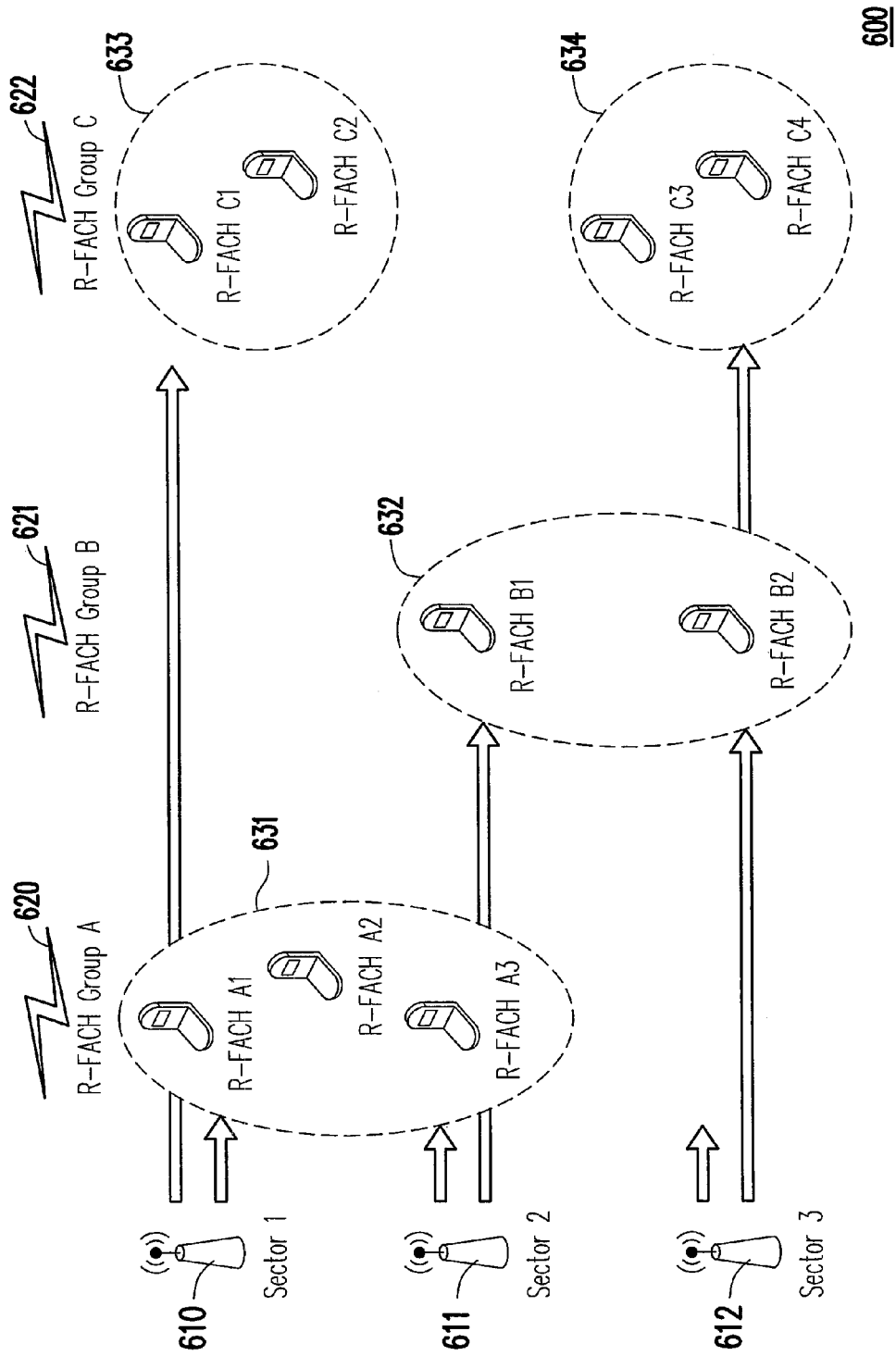
FIG. 6 is a schematic view of wireless communication system for access procedure enhancement according to an embodiment of the invention.

In some embodiments of the invention, access collisions caused by the access dimension limit problem may be alleviated by using multi-channel multi-hub model with an FDM or Orthogonal Frequency Division Multiple Access (OFDMA) sub-channels and by increasing the processing gain. The network access mechanisms described hereafter are based on the systems and methods in FIG. 2-FIG. 5 with a multi-channel multi-hub model to achieve high macro-diversity, collision avoidance, link budget advantage, and RL positioning friendliness. FIG. 6 is a schematic view of wireless communication systems for access procedure enhancement according to an embodiment of the invention. With reference to FIG. 6, each of the wireless communication devices depicted in the device clusters 631-634 include a transceiver module performing wireless transmissions and receptions to and from a network, and a communication protocol module. In the present embodiment, the communication protocol module of the wireless communication device can divide an access channel into a plurality of narrow band frequency division multiplexing (FDM) channels. As shown in FIG. 6, a plurality of reverse link FDM access channels (R-FACHs A1-A3, R-FACHs B1-B2, and R-FACHs C1-C4) are grouped into a plurality of R-FACH groups (R-FACH Group A (620), R-FACH Group B (621), and R-FACH Group C (622)). Moreover, according to FIG. 6, whether a base station (e.g., in Sectors 1-3) in a network supports an access probe is determined. If yes, the base stations (in Sectors 1-3) join at least one R-FACH group. For example, as shown in FIG. 6, in Sector 1, a base station 610 may join R-FACH Groups A and C (620 and 622) according to one network plan, although in an alternative network plan, the base station 610 may join only one R-FACH group or all three R-FACH group, and the invention is not limited thereto. In Sector 2, a base station 611 may join R-FACH Groups A and B (620 and 621), and in Sector 3, a base station 612 may join R-FACH Groups B and C (621 and 622). Each of the base stations 610-612 in Sectors 1-3 maintains a local table of the R-FACH groups and the members thereof. Moreover, during each access procedure, the access probes are sent by each of the wireless communication devices in the device clusters 631-634 in a chosen R-FACH.

According to some embodiments of the invention, after the base station joins the at least one R-FACH group, the base station informs the wireless communication device regarding the R-FACH groups which the base station has membership, the base station informs the wireless communication device regarding the R-FACH groups each of the neighbors of the base station has membership, and the base station updates the wireless communication device when a change occurs in the group memberships. For example, the base station 610 may inform the wireless communication devices in the device clusters 631-634 which R-FACH groups the base station 610 has membership. The base station 610 may further inform the wireless communication devices in the device clusters 631-634 regarding the R-FACH groups each of the neighbors of the base station 610 has membership. Moreover, the base station 610 may update the wireless communication devices in the device clusters 631-634 when a change occurs in the group memberships.

According to one embodiment, each of the R-FACH groups is identified by an unique pseudo noise (PN) long code mask. For instance, the R-FACH Group A (620) may be identified by a PN long code mask A, the R-FACH Group B (621) may be identified by a PN long code mask B, and the R-FACH Group C (622) may be identified by a PN long code mask C, in which code masks A, B, and C may be different unique code masks, for example. In another embodiment, when the base station in the network does not support the access probe, the base station monitors access probes at a predetermined rate. In one embodiment, the non-supporting base station may monitor access probes at a predetermined rate of 1.2288 MHz. According to another embodiment, a bandwidth of each R-FACH is a multiple of 6.4 kHz. Moreover, the number of R-FACHs per access channel is configurable. In one embodiment, a maximum number of R-FACHs for a 1.25 Mhz CDMA channel may be 192 to follow 1xHRPD numerology, although the invention is not limited thereto.

Figure 7:
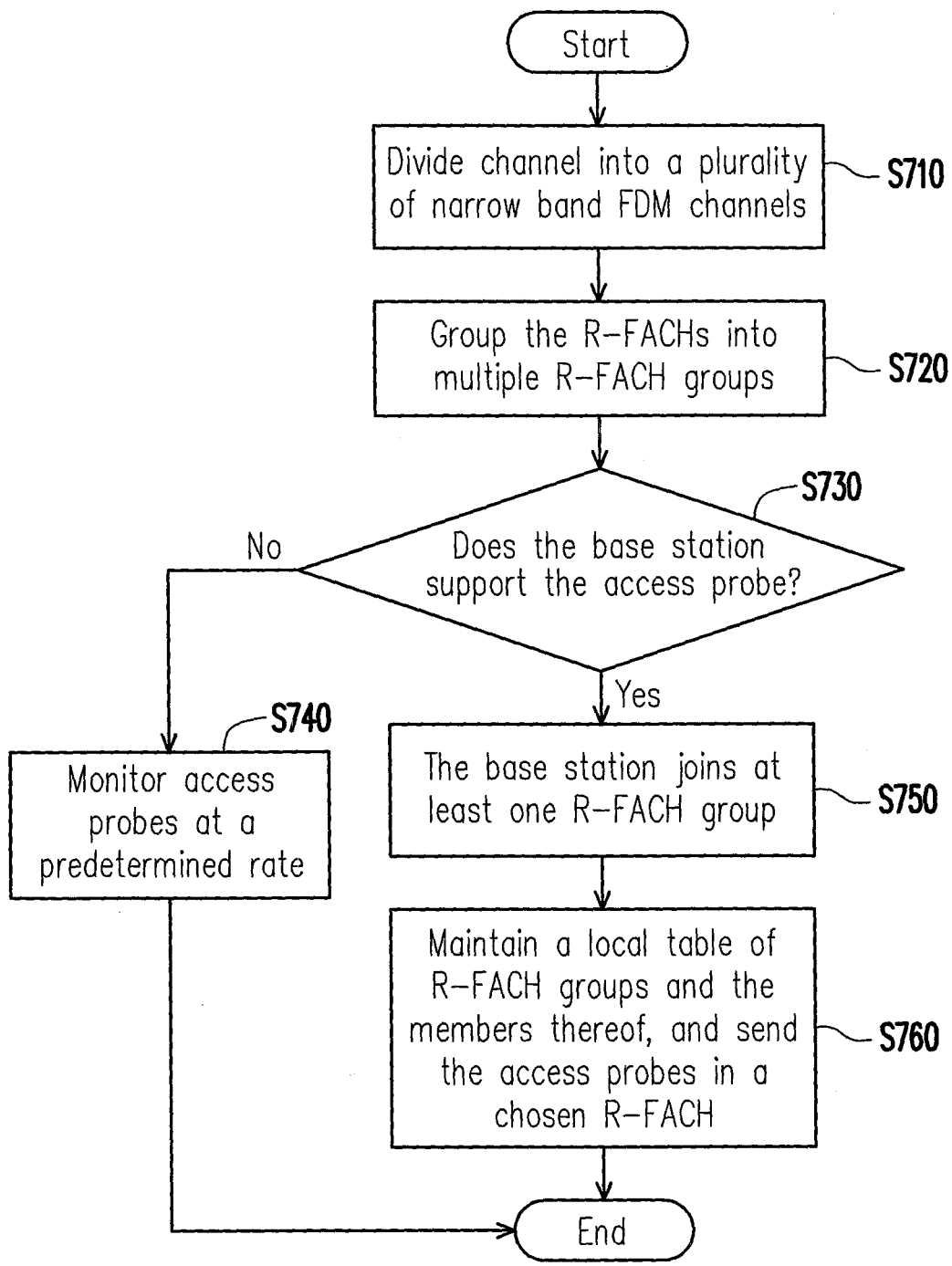
FIG. 7 is a flow diagram of a method for access procedure enhancement according to an embodiment of the invention.

Based on the above description, a method for access procedure enhancement by a wireless communication device including a transceiver module for wireless transmissions and receptions can be obtained. FIG. 7 is a flow diagram of a method for access procedure enhancement according to an embodiment of the invention. In Step S710, an access channel is divided into a plurality of narrow band FDM channels. In Step S720, a plurality of R-FACHs are grouped into a plurality of R-FACH groups. In Step S730, whether a base station supports the access probe is determined. If yes, the base station joins at least one R-FACH group (Step S750). The base station maintains a local table of the R-FACH groups and the members thereof, and the access probes are sent by the wireless communication device in a chosen R-FACH in each access procedure (Step S760). If the base station does not support the access probe, the base station monitors access probes at a predetermined rate (Step S740).

In view of the foregoing, embodiments of the invention have discussed wireless communication devices and methods for access procedure enhancement which enable access probes that minimize the impact on the existing services when M2M terminals increase, and improve the access success rate of the M2M terminals. By adopting the devices and methods set forth in the disclosure, issues such as the RoT contribution from the M2M terminals, the potential dimension limit of the current RL channels, as well as other related problems such as macro-diversity and the detection complexity dilemma, network imbalance, and the load and throughput dilemma can be alleviated. The devices and methods set forth in the disclosure can also provide enhancements to network positioning and terminal battery life.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. A method for access procedure enhancement by a wireless communication device comprising a transceiver module for wireless transmissions and receptions, the method comprising:
dividing an access channel into a plurality of narrow band frequency division multiplexing channels;
grouping a plurality of reverse link frequency division multiplexing access channels into a plurality of reverse link frequency division multiplexing access channel groups;
determining whether a base station in a network supports an access probe, and if yes, the base station joins at least one reverse link frequency division multiplexing access channel group; and
sending the access probe in the at least one reverse link frequency division multiplexing access channel group during each access procedure,
wherein the wireless communication device is a machine to machine communication device, and the method further comprises:
the base station maintaining a local table of the reverse link frequency division multiplexing access channel groups and the members thereof,
wherein the method further comprises:
the base station informing the wireless communication device regarding the reverse link frequency division multiplexing access channel groups which the base station has membership;
the base station informing the wireless communication device regarding the reverse link frequency division multiplexing access channel groups each of the neighbors of the base station has membership; and
the base station updating the wireless communication device when a change occurs in the group memberships.

2. The method of claim 1, wherein each of the reverse link frequency division multiplexing access channel groups is identified by an unique pseudo noise long code mask.

3. The method of claim 1, wherein when the base station in the network does not support the access probe, the base station monitors access probes at a predetermined rate.

4. The method of claim 3, wherein the predetermined rate is 1.2288 MHz.

5. The method of claim 1, wherein a bandwidth of each reverse link frequency division multiplexing access channel is a multiple of 6.4 kHz.

6. A wireless communication device for access procedure enhancement, comprising:
a transceiver module performing wireless transmissions and receptions to and from a network; and
a communication protocol module dividing an access channel into a plurality of narrow band frequency division multiplexing channels, grouping a plurality of reverse link frequency division multiplexing access channels into a plurality of reverse link frequency division multiplexing access channel groups, determining whether a base station in a network supports an access probe, and if yes, the base station joins at least one reverse link frequency division multiplexing access channel group, and sending the access probe in the at least one reverse link frequency division multiplexing access channel during each access procedure,
wherein the wireless communication device is a machine to machine communication device,
wherein the base station maintains a local table of the reverse link frequency division multiplexing access channel groups and the members thereof,
wherein the base station informs the wireless communication device regarding the reverse link frequency division multiplexing access channel groups which the base station has membership, the base station informs the wireless communication device regarding the reverse link frequency division multiplexing access channel groups each of the neighbors of the base station has membership, and the base station updates the wireless communication device when a change occurs in the group memberships.

7. The wireless communication device of claim 6, wherein each of the reverse link frequency division multiplexing access channel groups is identified by an unique pseudo noise long code mask.

8. The wireless communication device of claim 6, wherein when the base station in the network does not support the access probe, the base station monitors access probes at a predetermined rate.

9. The wireless communication device of claim 8, wherein the predetermined rate is 1.2288 MHz.

10. The wireless communication device of claim 6, wherein a bandwidth of each R-FACH is a multiple of 6.4 kHz.

* * * * *